United States Patent [19]

Koresawa et al.

[11] 4,138,416
[45] Feb. 6, 1979

[54] NON-ALLERGENIC LANOLIN AND PRODUCTION OF SAME

[75] Inventors: Takeshi Koresawa, Shiga; Eiji Yoden, Oomihachiman, both of Japan

[73] Assignee: Dai-Ichi Croda Chemicals Kabushiki Kaisha, Osaka, Japan

[21] Appl. No.: 836,794

[22] Filed: Sep. 26, 1977

[30] Foreign Application Priority Data

Sep. 28, 1976 [JP] Japan ................................. 51-117034

[51] Int. Cl.$^2$ ............................................... C07J 9/00
[52] U.S. Cl. ................................................. 260/397.25
[58] Field of Search .................................... 260/397.25

[56] References Cited

U.S. PATENT DOCUMENTS

| 4,072,697 | 2/1978 | Sekine et al. ..................... 260/397.25 |
| 4,091,035 | 5/1978 | Clark ............................... 260/397.25 |

*Primary Examiner*—Elbert L. Roberts
*Assistant Examiner*—Robert C. Whittenbaugh
*Attorney, Agent, or Firm*—Haight & Huard

[57] ABSTRACT

Woolgrease or lanolin is fractionated into non-polar lanolin wax and polar lanolin wax by passing a solution of woolgrease or lanolin in a non-polar solvent through a column of an adsorption medium and evaporating the passed solution to recover the non-polar lanolin wax. The non-polar lanolin wax exhibits non-allergenic properties.

8 Claims, No Drawings

NON-ALLERGENIC LANOLIN AND PRODUCTION OF SAME

This invention relates to non-allergenic lanolin and a method for producing the same. More particularly, it relates to the production of non-allergenic lanolin by fractionating woolgrease or lanolin into non-polar components and polar components by selectively adsorbing the polar components onto an adsorbing medium.

Woolgrease found in sheep's wool is a brown colored material, containing animal fatty materials of high odor. This material is recovered by separation from wool scouring effluents and contains wool dust, sand and other impurities. Chemically it contains free wool alcohols and free wool fatty acids which are not only a source of skin irritation if used in cosmetic raw materials, but also cause a sticky appearance and the high odor which is characteristic of woolgrease.

In order to improve such defects, woolgrease is generally refined by acid treatment in an aqueous system by adding suitable quantities of hot water and an acid such as sulfuric acid to the woolgrease, at the same time heating and agitating the whole mix. The mix is then neutralized by addition of an alkali compound such as sodium hydroxide or sodium carbonate, washed with water, bleached and dried to obtain lanolin.

Woolgrease may be refined by dissolving woolgrease in an organic solvent such as methyl ethyl ketone or isopropyl alcohol, treating the solution with an acid such as sulfuric acid at 60°–80° C. with stirring, neutralizing with an alkali such as sodium hydroxide or sodium carbonate, washing with clean water, and removing the solvent from the solution. Lanolin is obtained by bleaching and drying the residue.

The above methods have a defect that it is difficult to remove proteins and the characteristic animal odor.

Thus, it is hardly possible by the prior art to obtain a less-sticky, odorless white lanolin from woolgrease.

Lanolin refined by above methods contains free fatty alcohols and sterols. Fawaz (Fawaz F. Miet C & Puiseux F. annuals Pharmaceutiques Francaise: 31 63–72) and others confirmed free lanolin alcohols in lanolin. Especially when used as raw material for cosmetics, it is very important that odor and skin irritation are obviated and a pale colour is obtained.

Especially, if lanolin is applied on the human skin, there may occurr an allergy reaction. Sulzberger et al. have concluded that allergen exists in the fraction of fatty alcohols.

It is an object of the invention to provide a method for refining woolgrease or lanolin to obtain lanolin which is free from skin irritating and allergenic substances, odorous substances and colorants.

According to the present invention, we have found that woolgrease or lanolin may be fractionated into non-polar lanolin wax and polar lanolin wax by passing a solution of woolgrease or lanolin in a non-polar solvent through a column of an adsorption medium for free fatty alcohols, and evaporating the passed solution to recover the nonpolar lanolin wax. The polar lanolin wax may be recovered by eluting the column with a polar solvent and evaporating the elute.

The content of lanolin fatty acids and lanolin alcohols in lanolin has been studied by many workers and published, for example, by E. V. Truter in J. Soc. Cosm. Chem. 1962 as follows.

Table A.

| Lanolin Fatty Acids Content: | | |
|---|---|---|
| Fatty acids content | Carbon number | content, % |
| normal fatty acids | $C_{10}$–$C_{32}$ even numbers | 7 |
| normal fatty acids | $C_{13}$–$C_{17}$ odd numbers | |
| Iso-fatty acids | $C_{10}$–$C_{32}$ even numbers | 23 |
| Anti-iso fatty acids | $C_9$–$C_{31}$ odd numbers | 30 |
| α-hydroxyl-normal fatty acids | $C_{12}$–$C_{24}$ even numbers | 15 |
| α-hydroxyl-normal fatty acids | $C_{11}$–$C_{23}$ odd numbers | |
| α-hydroxyl-iso fatty acids | $C_{14}$–$C_{24}$ even numbers | 11 |
| α-hydroxyl-anti-iso F.A. | $C_{13}$–$C_{25}$ odd numbers | 4 |
| ω-hydroxyl-normal F.A. | $C_{26}$–$C_{34}$ even numbers | 3 |
| ω-hydroxyl-iso F.A. | $C_{30}$–$C_{32}$ even numbers | 0.5 |
| ω-hydroxyl-anti-iso F.A. | $C_{27}$–$C_{33}$ odd numbers | 1 |
| Total of confirmed F.A. | | 94.5 |
| Unconfirmed contents | | 5.5 |

Table B.

| Unsaponified substances | Lanolin alcohol content: Carbon number | Content, % |
|---|---|---|
| Normal hydrocarbons | $C_{13}$–$C_{33}$ odd numbers | |
| Iso-hydrocarbons | $C_{14}$–$C_{32}$ even numbers | 1 |
| Anti-iso hydrocarbons | $C_{15}$–$C_{29}$ odd numbers | |
| Normal aliphatic alcohols | $C_{16}$–$C_{30}$ even numbers | 4 |
| " | $C_{17}$–$C_{33}$ odd numbers | |
| Iso aliphatic alcohols | $C_{16}$–$C_{24}$ even numbers | 6 |
| Anti-iso aliphatic alcohols | $C_{17}$–$C_{33}$ odd numbers | 7 |
| Normal aliphatic 1-2 diols | $C_{14}$–$C_{24}$ even numbers | |
| " | $C_{17}$–$C_{23}$ odd numbers | 4 |
| Iso aliphatic 1-2 diols | $C_{14}$–$C_{24}$ even numbers | |
| Anti-iso aliphatic 1-2 diols | $C_{15}$–$C_{25}$ odd numbers | |
| C27 sterols | Subtotal 37% | |
| Cholesterol | | 30 |
| 7-oxo-cholesterol | | 3 |
| Cholestan-3,5,6-triol | | 2 |
| Cholestanol | | 1 |
| Cholestan-3,5-dien-7-one | | 1 |
| C30 tri-terpene alcohols | Subtotal 39% | |
| Lanostadienol | | 16 |
| Lanostanol | | 16 |
| Agnostadienol | | 1 |
| Agnostenol | | 3 |
| 7-oxo-lanostenol | | 2 |
| 7,11-dioxy-lanostenol | | 1 |
| Total of confirmed unsaponified substances | | 98 |

Table B.-continued

| Unsaponified substances | Lanolin alcohol content: Carbon number | Content, % |
|---|---|---|
| Unconfirmed contents | | 2 |

As can be seen in Table B, lanolin contains a total of about 21% of fatty alcohols. Woolgrease contains a certain amount of the alcohols and the fatty acids in the form of free alcohols and free acids.

We have found that when a solution of woolgrease or lanolin in a non-polar solvent is passed through a column of an adsorption medium, the free alcohols and the free acids along with other odorous impurities and colorant are selectively adsorbed onto the adsorption medium and the passed fraction contains the non-polar components of lanolin which are substantially non-allergenic.

The present invention has its basis on such finding.

The non-polar solvent which may be used in the present invention includes aliphatic and aromatic hydrocarbons such as n-hexane, 3-methylpentane, petroleum ether, benzene, toluene or cyclohexane, chlorinated hydrocarbons such as chloroform or carbon tetrachloride and mixtures thereof.

The adsorption medium to be employed in the present invention includes porous minerals such as activated clay, Japanese acid clay, bentonite, alumina, silica gel, aluminum silicate, magnesium silicate, zeolite and mixtures thereof. Preferable particle size of the adsorbent ranges from 16 to 200 mesh preferably 30 to 200 mesh.

Since the starting woolgrease contains foreign substances which will cause clogging of the adsorption column, it is preferable to remove these substances by filtering the solution, for example, in a filter press.

The amount of non-polar solvent to be used in the method of the invention ranges from 1.5 to 7.5 parts, preferably 2.5 to 4 parts by volume for dissolving 1 part by weight of the starting wool grease or lanolin. The amount of adsorbent ranges from 2 to 10 parts, preferably 4 to 7.5 parts by weight for treating 1 part by weight of the starting woolgrease or lanolin.

After passing the solution, the column is washed with the non-polar solvent as used in dissolving woolgrease or lanolin. The amount of the solvent used for this purpose ranges from 2.5 to 15 parts, preferably 5 to 10 parts by volume for treating 1 part by weight of the starting woolgrease or lanolin. After washing, the passed solution and the washing are combined. Nonpolar lanolin wax is obtained by evaporating the combined mixture to remove the solvent.

Polar lanolin wax which has been adsorbed on the adsorbent column may be recovered by eluting the column with a polar solvent and evaporating the eluate. The polar solvent includes alkanols such as methanol, ethanol or isopropanol, esters thereof such as ethyl acetate and mixtures thereof. The amount of the polar solvent used for this purpose ranges from 2.5 to 15 parts, preferably 5 to 10 parts by volume for treating 1 part by weight of the starting woolgrease.

After elution, the column of adsorbent may be regenerated by heating the column at a temperature of 100° to 150° C. and passing nitrogen gas therethrough for 6 to 20 hours. Thus, the column may be repeatedly used as many as 20 times.

When the polar solvent is passed to elute the adsorbed components on the adsorbent, the initial fraction contains mixture of polar solvent and non-polar solvent. This mixture, however, may be separated into respective solvents by fractional distillation and traces of solvent in the resulting lanolin waxes may be removed by steam distillation under reduced pressure.

The resulting non-polar lanolin wax is substantially free from unpleasant odor and color and is non-allergenic. It can find a wider range of uses than conventional lanolin in the cosmetic and pharmaceutical fields.

The polar lanolin wax exhibits improved characteristics in hydrating, emulsifying, plasticizing and lubricating properties as compared with conventional lanolin and can find uses in various industrial fields.

We have found that the resulting non-polar lanolin wax is non-allergenic when the content of free 1,2-diols therein is not more than 0.26% and the total content of free fatty alcohols including the diols is not more than 1.7%.

The method of the present invention may be repeated twice or more to reduce the free diols and free fatty alcohols below said content, though said content is usually reached by a single operation of the method of the present invention.

The following examples illustrate the present invention.

EXAMPLE 1

20 parts by weight of woolgrease were dissolved in 50 part by volume of a non-polar solvent named in Table I-1. The solution was passed through a column of activated clay (100 parts by weight). 100 parts by volume of the non-polar solvent as used in making the solution is then passed through the column. The passed solution and the solvent were combined and evaporated to remove the solvent, yielding non-polar lanolin wax.

100 parts by volume of a polar solvent named in Table I-1 were passed through the column to elute the fraction adsorbed thereon. The eluate was collected and evaporated to remove the polar solvent, yielding polar lanolin wax. The yields of non-polar and polar lanolin waxes, appearance, acid and hydroxyl numbers thereof are shown in Tables I-1, I-2 and I-3 respectively.

Table I-1.

| | Results of various solvent combination. | | | |
|---|---|---|---|---|
| | solvent combination | | yield(%) | |
| Example | non-polar solvent | polar solvent | non-polar lanolin wax | polar lanolin wax |
| 1-1 | n-hexane | methanol | 41.0 | 57.0 |
| 1-2 | n-hexane | ethanol | 40.5 | 58.5 |
| 1-3 | n-hexane | isopropanol | 39.0 | 55.5 |
| 1-4 | n-hexane | ethyl acetate | 40.9 | 52.0 |
| 1-5 | cyclohexane | methanol | 41.4 | 57.0 |
| 1-6 | pentane | methanol | 42.0 | 57.2 |
| 1-7 | 3-methyl pentane | methanol | 41.0 | 57.5 |

Table I-2

| | Appearance and odor | | | |
|---|---|---|---|---|
| | non-polar lanolin wax | | polar lanolin wax | |
| Example | appearance | odor | appearance | odor |
| 1-1 | white paste | slightly lanolin odor | brown colored paste | animal odor |
| 1-2 | " | " | " | " |
| 1-3 | " | " | " | " |

Table I-2-continued

| | Appearance and odor | | | |
|---|---|---|---|---|
| | non-polar lanolin wax | | polar lanolin wax | |
| Example | appearance | odor | appearance | odor |
| 1-4 | " | " | " | " |
| 1-5 | " | " | " | " |
| 1-6 | " | " | " | " |
| 1-7 | " | " | " | " |
| lanolin 1) | yellow colored paste | lanolin odor | | |
| lanolin 2) | " | " | | |
| Woolgrease | brown grease | animal odor | | |

Table I-3

| | non-polar lanolin wax | | polar lanolin wax | |
|---|---|---|---|---|
| Example | acid number | OH number | acid number | OH number |
| 1-1 | 0.12 | 0.65 | 8.1 | 44.3 |
| 1-3 | 0.10 | 0.11 | 7.0 | 50.5 |
| 1-4 | 0.11 | 0.10 | 6.6 | 41.1 |
| 1-5 | 0.17 | 0.17 | 6.8 | 46.0 |
| 1-6 | 0.11 | 0.68 | 8.0 | 51.8 |
| 1-7 | 0.16 | 0.15 | 8.8 | 51.6 |
| lanolin 1) | 0.56 | 26.3 | | |
| lanolin 2) | 0.60 | 25.8 | | |
| woolgrease | 4.7 | 29.0 | | |

1)Lanolin from woolgrease refined by conventional acid treatment in an aqueous solution.
2)Lanolin from woolgrease refined by conventional treatment with a solvent.

The resulting non-polar and polar waxes were analyzed as to their free fatty alcohol content and tested on their allergenic properties. Analysis of free fatty alcohols was performed by gas chromatography with acetylated samples.

Allergy tests were judged as negative when all of ten persons who were hypersensitive to lanolin showed negative reactions on a patch test. The results obtained are shown in Table I-4.

Table I-4

Relation between allergenic reaction and content of free fatty alcohols.

| | Content of free fatty alcohol(%) | | Allergy test | |
|---|---|---|---|---|
| Example | non polar lanolin wax | polar lanolin wax | non polar lanolin wax | polar lanolin wax |
| 1-1 | 0.4 | 7.8 | negative | positive |
| 1-2 | 0.1 | 7.5 | " | " |
| 1-3 | 0.1 | 7.9 | " | " |
| 1-4 | 0.1 | 7.8 | " | " |
| 1-5 | 0.2 | 7.5 | " | " |
| 1-6 | 0.4 | 7.2 | " | " |
| 1-7 | 0.1 | 7.8 | " | " |
| Lanolin 1) | 3.1 | | positive | |

EXAMPLE 2

The procedure of Example 1-1 was repeated with varying amounts of woolgrease, n-hexane and methanol respectively using 100 parts by weight of activated clay as shown in Table II-1.

The results obtained are shown in Tables II-2, II-3 and II-4.

Table II-1

| | Amount of solvent and woolgrease | | |
|---|---|---|---|
| Example | woolgrease | n-hexane | methanol |
| 2-1 | 30 | 50 | 50 |
| 2-2 | 50 | 200 | 200 |
| 2-3 | 60 | 300 | 300 |

Table II-2

| | Yield (%) | |
|---|---|---|
| Example | non-polar lanolin wax | polar lanolin wax |
| 2-1 | 31.0 | 25.5 |
| 2-2 | 48.7 | 50.1 |
| 2-3 | 49.0 | 50.5 |

Table II-3

| | Appearance and odor | | | |
|---|---|---|---|---|
| | non-polar lanolin wax | | polar lanolin wax | |
| Example | appearance | odor | appearance | odor |
| 2-1 | white paste | slightly lanolin odor | Brown paste | animal odor |
| 2-2 | " | " | " | " |
| 2-3 | " | " | " | " |

Table II-4

| | non-polar lanolin wax | | polar lanolin wax | |
|---|---|---|---|---|
| Ex. | acid number | OH number | acid number | OH number |
| 2-1 | 0.10 | 0.21 | 7.5 | 40.2 |
| 2-2 | 0.10 | 0.10 | 8.1 | 48.3 |
| 2-3 | 0.17 | 0.63 | 7.7 | 51.0 |

Table II-5

Relation of allergenic reaction and free fatty content.

| | Free fatty alcohol content(%) | | Allergy test | |
|---|---|---|---|---|
| Ex. | non-polar lanolin wax | polar lanolin wax | non-polar lanolin wax | polar lanolin wax |
| 2-1 | 0.1 | 5.5 | negative | positive |
| 2-2 | 0.1 | 7.0 | " | " |
| 2-3 | 0.2 | 7.9 | " | " |

EXAMPLE 3

The procedure of Example 1-1 was repeated except that Japanese acid clay, zeolite, silica gel and activated alumina were used in comparison with activated clay.

The results obtained are shown in Tables III-1 to III-4.

Table III-1

Relation between adsorption medium and yield

| | | Yield | |
|---|---|---|---|
| Example | adsorbing agent | non-polar lanolin wax | polar lanolin wax |
| 3-1 | activated clay | 45.5 | 52.0 |
| 3-2 | acid clay | 49.0 | 48.8 |
| 3-3 | zeolite | 33.3 | 49.5 |
| 3-4 | silica gel | 40.6 | 57.0 |
| 3-5 | activated alumina | 48.0 | 50.5 |

Table III-2

| | Appearance and odor | | | |
|---|---|---|---|---|
| | non-polar lanolin wax | | polar lanolin wax | |
| Example | appearance | odor | appearance | odor |
| 3-1 | white paste | slightly lanolin odor | brown paste | animal odor |
| 3-2 | " | " | " | " |
| 3-3 | " | " | " | " |
| 3-4 | " | " | " | " |
| 3-5 | " | " | " | " |

Table III-3

| | non-polar lanolin wax | | polar lanolin wax | |
|---|---|---|---|---|
| Ex. | acid number | OH number | acid number | OH number |
| 3-1 | 0.10 | 0.75 | 8.8 | 48.2 |
| 3-2 | 0.10 | 0.60 | 7.3 | 48.0 |

Table III-3-continued

| | non-polar lanolin wax | | polar lanolin wax | |
|---|---|---|---|---|
| Ex. | acid number | OH number | acid number | OH number |
| 3-3 | 0.73 | 0.99 | 8.0 | 39.2 |
| 3-4 | 0.09 | 0.10 | 8.1 | 50.8 |
| 3-5 | 0.11 | 0.22 | 5.4 | 50.0 |

Table III-4

Relation of allergenic reaction and free fatty alcohol content.

| | Free fatty alcohol contents(%) | | Allergy test | |
|---|---|---|---|---|
| Example | non-polar lanolin wax | polar lanolin wax | non-polar lanolin wax | polar lanolin wax |
| 3-1 | 0.1 | 7.8 | negative | positive |
| 3-2 | 0.1 | 7.5 | " | " |
| 3-3 | 0.1 | 6.5 | " | " |
| 3-4 | 0.1 | 7.0 | " | " |
| 3-5 | 0.1 | 7.4 | " | " |

EXAMPLE 4

The procedure of Example 1-1 was repeated except that activated clay and solvents were used in amounts shown in Table IV-1. The results obtained are shown in Tables IV-2 to IV-4.

Table IV-1

Relation between yield and amount of adsorbent.

| | Amount of activated: n-hexane: methanol clay | Yield(%) | |
|---|---|---|---|
| Example | | non-polar lanolin wax | polar lanolin wax |
| 4-1 | 30  50  50 | 68.3 | 31.1 |
| 4-2 | 200  200  200 | 50.5 | 49.1 |
| 4-3 | 300  300  300 | 45.0 | 48.5 |

Table IV-2

Appearance and odor.

| | Non-polar lanolin wax | | polar lanolin wax | |
|---|---|---|---|---|
| Example | appearance | odor | appearance | odor |
| 4-1 | pale yellow paste | slightly lanolin odor | brown paste | animal odor |
| 4-2 | white paste | " | " | " |
| 4-3 | " | " | " | " |

Table IV-3

| | non-polar lanolin wax | | polar lanolin wax | |
|---|---|---|---|---|
| Ex. | acid number | OH number | acid number | OH number |
| 4-1 | 0.88 | 14.5 | 7.0 | 38.5 |
| 4-2 | 0.05 | 0.10 | 7.3 | 52.8 |
| 4-3 | 0.05 | 0.10 | 8.0 | 52.5 |

Table IV-4

Relation between allergenic reaction and free aliphatic alcohol contents.

| | Free fatty alcohol content(%) | | Allergy test | |
|---|---|---|---|---|
| Example | non-polar lanolin wax | polar lanolin wax | non-polar lanolin wax | polar lanolin wax |
| 4-1 | 0.1 | 4.9 | negative | positive |
| 4-2 | 0.1 | 7.4 | " | " |
| 4-3 | 0.1 | 7.5 | " | " |

EXAMPLE 5

The procedure of Example 1-1 was repeated except that lanolin from woolgrease refined by conventional acid treatment (No. 5-1) free fatty acid-rich woolgrease which was obtained as a by-product the conventional acid treatment (No. 5-2) and liquid lanolin produced by conventional wintering process (No. 5-3) were used as the starting materials.

Yields of non-polar lanolin wax and polar lanolin wax and their allergenic properties are shown in Tables V-1 and V-2 respectively.

Table V-1.

| | Yield (%) | |
|---|---|---|
| Example | non-polar lanolin wax | polar lanolin wax |
| 5-1 | 41.2 | 57.0 |
| 5-2 | 26.0 | 72.4 |
| 5-3 | 38.0 | 59.0 |

Table V-2.

Relation between allergenic reaction and free fatty alcohol content.

| | Free fatty alcohol content(%) | | Allergy Test | |
|---|---|---|---|---|
| Example | non-polar lanolin wax | polar lanolin wax | non-polar lanolin wax | polar lanolin wax |
| 5:1 | 0.1 | 6.8 | negative | positive |
| 5-2 | 0.1 | 12.5 | " | " |
| 5-3 | 0.1 | 8.6 | " | " |

EXAMPLE 6

In order to determine correlation between allergenic reactions and the content of free fatty acids, the allergy test in Example 1 was carried out varying content of free fatty alcohol by adding an amount of free alcohol to the non-allergenic lanoline wax obtained in Example 1-2.

The free fatty alcohol was prepared by eluting the column used in said Example onto which the polar lanolin wax was adsorbed with chloroform, ethyl acetate and methanol successively. The methanol fraction contained about 80% of free fatty alcohol.

The results obtained are shown in Table 6.

Table 6.

| Content of free fatty alcohol (%) | | |
|---|---|---|
| total | 1,2-diols | Allergy test |
| 0.1 | — | negative |
| 0.5 | — | " |
| 1.0 | 0.10 | " |
| 1.5 | 0.15 | " |
| 1.7 | 0.26 | " |
| 1.8 | 0.28 | positive |
| 2.0 | — | " |
| 3.1 | — | " |

From the foregoing, it is apparent that the purified lanolin wax becomes non-allergenic at a total free fatty alcohol content of 1.7% or less and a 1,2-diol content of 0.26% or less.

What is claimed is:

1. A method for producing non-allergenic lanolin wax which comprises passing a solution of woolgrease or lanolin dissolved in a non-polar solvent selected from the group consisting of aliphatic and aromatic hydrocarbons, chlorinated hydrocarbons and mixtures thereof through a column of an adsorption medium for free fatty alcohols, eluting the column with said non-polar solvent, and evaporating the passed solution and the eluate.

2. The method of claim 1, wherein said non-polar solvent is n-hexane, 3-methylpentane, petroleum ether, cyclohexane, benzene, toluene, chloroform or carbon tetrachloride.

3. The method of claim 1, wherein said adsorption medium is a porous mineral selected from the group consisting of activated clay, Japanese acid clay, bentonite, alumina, silica gel, aluminium silicate, magnesium silicate, zeolite or mixtures thereof.

4. A method for fractionating woolgrease or lanolin which comprises passing a solution of woolgrease or lanolin dissolved in a non-polar solvent selected from the group consisting of aliphatic and aromatic hydrocarbons, chlorinated hydrocarbons and mixtures thereof through a column of an adsorption medium for free fatty alcohols, eluting the column with said non-polar solvent and a polar solvent selected from the group consisting of an alkanol, an ester thereof and mixtures thereof successively, collecting said non-polar solvent fraction and said polar solvent fraction separately and evaporating said fractions to remove the respective solvents therefrom.

5. The method of claim 4, wherein said non-polar solvent is n-hexane, 3-methylpentane, petroleum ether, cyclohexane, benzene, toluene, chloroform or carbon tetrachloride.

6. The method of claim 4, wherein said adsorption medium is a porous mineral selected from the group consisting of activated clay, Japanese acid clay, bentonite, alumina, silica gel, aluminium silicate, magnesium silicate, zeolite or mixtures thereof.

7. The method of claim 4, wherein said polar solvent is methanol, ethanol, isopropanol, ethyl acetate or mixtures thereof.

8. The method of claim 1, wherein said non-allergenic lanolin wax has a total free fatty alcohol content of not greater than 1.7% and a 1,2-diol content of not greater than 0.26%.

* * * * *